United States Patent [19]

Masri

[11] Patent Number: 4,944,886
[45] Date of Patent: Jul. 31, 1990

[54] METHOD OF SEWAGE TREATMENT

[76] Inventor: Saad A. Masri, 36 Wildwood Road West, Lethbridge, Alberta, Canada, T6K 6C6

[21] Appl. No.: 325,432

[22] Filed: Mar. 20, 1989

[30] Foreign Application Priority Data

Nov. 23, 1988 [CA] Canada .................................. 583868

[51] Int. Cl.⁵ .............................................. C02F 1/36
[52] U.S. Cl. .................................... 210/748; 210/804
[58] Field of Search ............... 210/718, 748, 770, 800, 210/804, 703, 764, 525; 422/20, 128; 204/157.15

[56] References Cited

U.S. PATENT DOCUMENTS

| | | | |
|---|---|---|---|
| 3,264,213 | 8/1966 | Pav et al. | 210/748 |
| 3,537,655 | 11/1970 | Gustafson | 422/128 |
| 3,630,377 | 12/1971 | Brooks | 210/748 |
| 3,906,679 | 9/1975 | Riedel | 51/163.2 |
| 4,211,744 | 7/1980 | Boucher | 422/20 |
| 4,308,229 | 12/1981 | Voit | 422/20 |
| 4,340,488 | 7/1982 | Toth et al. | 210/748 |
| 4,358,204 | 11/1982 | Ellner | 366/118 |
| 4,462,909 | 7/1984 | Kennel | 210/528 |
| 4,483,695 | 11/1984 | Covey, Jr. | 210/748 |
| 4,517,159 | 5/1985 | Karlson | 422/20 |
| 4,596,658 | 6/1986 | Mandt | 210/620 |

FOREIGN PATENT DOCUMENTS 809080 3/1969 Canada .

*Primary Examiner*—Peter Hruskoci
*Assistant Examiner*—Krisanne Shideler
*Attorney, Agent, or Firm*—Michael Sand Co.

[57] ABSTRACT

A method of sewage treatment is disclosed which consists of the following described steps: Firstly, directing the sewage to be treated into a holding tank; secondly, subjecting the sewage in the holding tank to ultrasonic vibrations in a range between 15 and 150 kilohertz for a period in excess of 12 seconds thereby achieving cavitation of the sewage; thirdly, draining the liquids from the sewage; and fourthly, removing the sewage residue remaining after drainage of liquids.

7 Claims, 2 Drawing Sheets

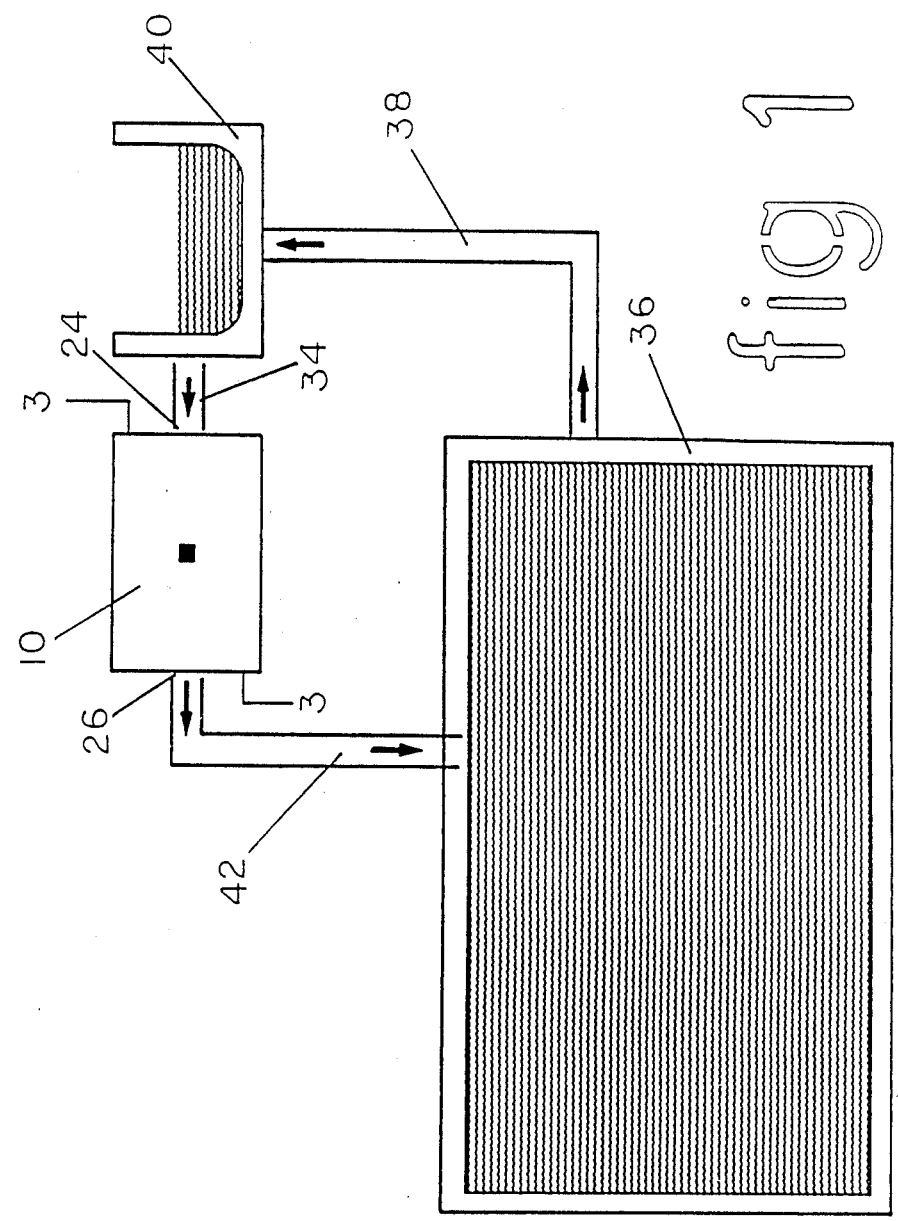

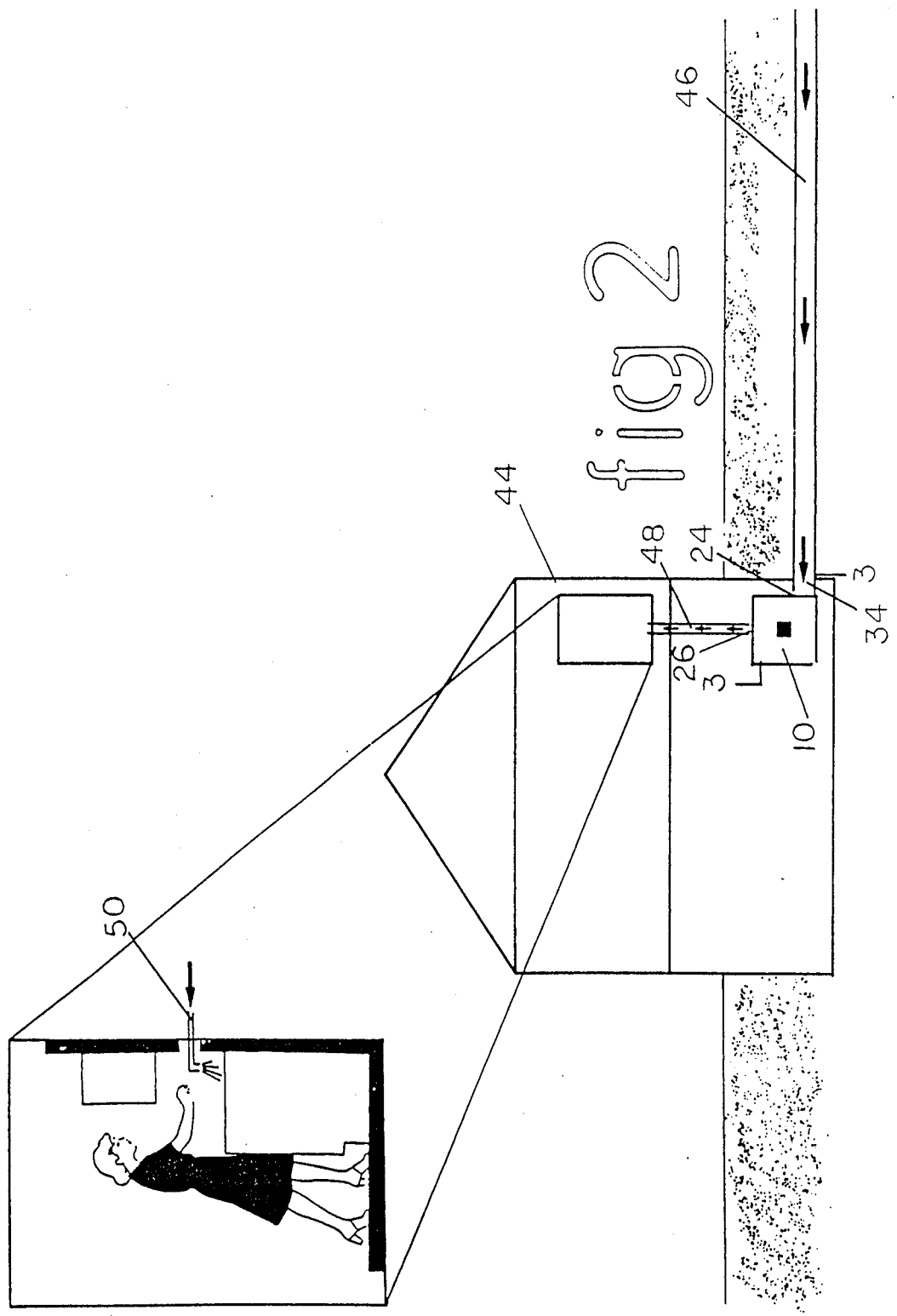

METHOD OF SEWAGE TREATMENT

The present invention relates to a method of sewage treatment.

BACKGROUND OF THE INVENTION

The method of sewage treatment commonly employed in North America consists of the following sequence of steps: Firstly, screening out coarse solids, such as tin cans, rags and paper. This is usually done through mechanical raking over a 24 hour period. Secondly, letting the sewage stand for a period of approximately 4 days to permit sedimentation. Thirdly, aerobically and anaerobically treating the sewage over a period of approximately 4 days by introducing an abundance of oxygen into the sewage to kill anaerobic bacteria and then introducing microorganisms into the sewage which deprive the sewage of oxygen to kill aerobic bacteria. Fourthly, diverting the sewage into secondary holding tanks and letting the sewage to stand for a further period of approximately 4 days to permit sedimentation. Fifthly, passing the liquid effluent through a series of lagoons into which chemicals are added and ultimately into the nearest body of water to reduce its potency. Sixthly, dehydrating the sludge over a 24 hour period, conditioning it with the addition of chemicals and composting with domestic refuse in a land fill site. There is a further step of filtration to which the liquids are subjected in some systems which takes an additional day, however, this step is often omitted to save expense.

The described method of sewage treatment takes approximately 14 days to complete and permits fungi and many disease causing microorganisms to survive. The survival of the fungi and microorganisms presents an environmental hazard as it results in many animal diseases (such as polio) and most plant diseases, being spread through our sewage treatment systems. This results in a waste of water as liquid effluent cannot be used to irrigate plants which are ultimately intended for human consumption.

SUMMARY OF THE INVENTION

What is required is a method of sewage treatment which will reduce the length of the treatment process while reducing the number of microorganisms which survive.

According to the present invention there is provided a method of sewage treatment which consists of the following described steps. Firstly, directing the sewage to be treated into a holding tank. Secondly, subjecting the sewage in the holding tank to ultrasonic vibrations in a range between 15 and 150 kilohertz for a period in excess of 12 seconds thereby achieving cavitation of the sewage. Thirdly, draining liquids from the sewage. Fourthly, removing the sewage residue remaining after drainage of liquids.

Although beneficial results may be obtained through the described method, even more beneficial results may be obtained if the sewage is degassed. This is achieved by subjecting the sewage to ultrasonic vibrations for a further period of approximately 3 hours.

Although beneficial results may be obtained through the described method, even more beneficial results may be obtained if the solids in the sewage are separated from the liquid through sedimentation. This is achieved by the addition of the further step of letting the sewage stand for between 6 and 24 hours to permit sedimentation to occur.

Although beneficial results may be obtained through the described method, even more beneficial results may be obtained if the liquid in the sewage is treated to remove inorganic impurities. This is achieved by the addition of a further step of draining liquids from the sewage and passing the liquids through a series of organic filters.

Although beneficial results may be obtained through the described method, even more beneficial results may be obtained if the sediment is placed into a solid form. This is achieved by the addition of a further step of dehydrating the residue of sewage sediment remaining after drainage of liquids.

BRIEF DESCRIPTION OF THE DRAWINGS

These and other features of the invention will become more apparent from the following description in which reference is made to the appended drawings, wherein:

FIG. 1 is a top plan view of a sewage treatment system configured according to a preferred method.

FIG. 2 is a section view of a sewage treatment system taken along section lines 2—2 of FIG. 1.

DETAILED DESCRIPTION OF THE PREFERRED EMBODIMENT

The preferred method is a method of sewage treatment described with reference to the representation of a sewage treatment facility illustrated in FIGS. 1 and 2, and generally designated by reference numeral 10.

The method consists of the following described steps:

Firstly, passing the sewage into a first tank 12. First tank 12 has a mechanical rake 14 rotatably mounted to screen out coarse solids. Mechanical rake 14 has a central shaft 16 from which extend a four arms 18. Each of arms 18 has a plurality of fingers 20 which extend downwardly into first tank 12 to engage the sewage.

Secondly, passing the sewage via drainage conduit 22 into a second tank 24. Second tank 24 has a plurality of ultrasonic probes 26 mounted on arms 28 which extend perpendicularly from a central shaft 30. Each of probes 26 extend into the sewage. The ultrasonic probes 26 are used to generate an ultrasonic frequency in a range of 15 to 150 kilohertz for a period of approximately 3 hours to permit cavitation and degassing to occur.

Thirdly, letting the sewage stand in second tank 24 for between 6 and 24 hours to permit sedimentation to occur.

Fourthly, draining liquids via conduit 32 from the sewage in second tank 24 and passing the liquids through a series of organic filters 34.

Fifthly, dehydrating and removing the sediment residue remaining in second tank 24 after drainage of liquids.

Having introduced and briefly described the basic components of the method in overview form, a detailed description of the steps will now be given together with an explanation as to why the step is necessary and how each step relates to the steps which follow.

The first step which was described was a screening through use of mechanical rake 14. Raw sewage often contains tin cans, paper, rags, sticks, and other debris. This debris presents a hazard to ultrasonic probes 26. If the steps of the method are all going to be performed in a single holding tank it is necessary to shield ultrasonic probes 26. As it is difficult to effectively shield ultrasonic probes 26, the applicant prefers to use a method employing two tanks 12 and 24. The screening of the coarse solids takes place in first tank 12, the applicant recommends that the sewage be screened in first tank 12 for approximately 24 hours. Once the initial screening has been completed, sewage is passed via conduit 22 into second tank 24.

The second described step is that of subjecting the sewage in second tank 24 to ultrasonic vibrations from ultrasonic probes 26. The exposure of the sewage to ultrasonic vibrations can be for a period of as short a duration as 12 seconds. 12 seconds is not sufficient to kill all bacteria, but it is sufficient to reduce the number of bacteria to levels which are within acceptable limits. The objective is to achieve cavitation. Cavitation is the formation followed by the rapid collapse of cavities throughout the sewage. Cavitation leads to the disruption of living cells, viral membranes and nucleic acids. This is superior to existing aerobic and anaerobic treatment methods as it kills or neutralizes all animal and plant diseases. Each of ultrasonic probes 26 are effective only within a defined radius. Steps must therefore be taken to ensure that the entire area of tank 24 has been subjected to the desired level of ultrasonic vibrations for a sufficient time period. The applicant recommends addressing this problem in two ways. The first way is by mounting probes 26 on arms 28. As central shaft 30 rotates arms 28 each of ultrasonic probes 26 move in a circular motion which ensures that all areas of second tank 24 are exposed to ultrasonic vibrations. The second way of addressing the problem is by extending the time exposure of the sewage to ultrasonic vibrations. In ideal conditions created in a laboratory the applicant has been able to demonstrate that an exposure of 12 seconds is sufficient to bring the number of bacteria down to acceptable levels. However, the treatment of sewage always must take place in less than ideal conditions and for this reason the applicant recommends exposing the sewage to ultrasonic vibrations for a period of approximately three hours. During this three hour time period the sewage is virtually sterilized. In addition the prolonged use of the probe has a degassing effect which accelerates the treatment process by promoting sedimentation. In the future tanks may be available which emit ultrasonic vibrations through the walls, but at the present time ultrasonic probes are the only viable method for creating the ultrasonic vibrations necessary for the method. A person wishing to use the method will most likely wish to use ultrasonic probes 26 which emit a frequency of 20 kilohertz. 20 kilohertz probes are widely available as this frequency is viewed as being superior for extending the life span of the probe as it does not stress or damage the converter or power supply. When placing the 20 kilohertz probes a person using the method will have to experiment and take readings of the ultrasonic vibrations in various parts of tank 24 to ensure that the desired frequency levels are reached. The range of the probe is related to its diameter. By way of illustration the applicant determined that for a tank with a capacity of 500 cubic meters, when using probes with a diameter of 5 centimeters, six probes were required in order to be confident that entire tank would be subject to vibrations of 20 kilohertz. Although it is of minor importance, the applicant has determined that it is possible to kill bacteria by using reflections of the ultrasonic vibrations. For this reason it is preferred that second tank 24 be oval in shape as this serves both to eliminate hard to reach corners and generally enhance the reflection of the ultrasonic vibrations.

The third described step is that of sedimentation. Once the ultrasonic treatment of the sewage has been completed, the sewage is left in second tank 24 for a period of between 6 and 24 hours to permit sedimentation to occur. The range of between 6 and 24 hours relates to the wide variation in the levels of detergents which may be found in sewage depending upon its source. High concentrations of detergents impede sedimentation. It follow that the higher the level of detergents the longer will be the period required before sedimentation occurs.

The fourth described step is draining the liquid in the sewage from second tank 24 through drainage conduit 32. At this stage the microorganisms in the liquid have been reduced to a level which permits the liquid to be used for irrigation even if the crop is ultimately intended for human consumption. However, the liquid still contains phosphorous, nitrates, and inorganic impurities and it is preferable that the liquid be passed through a series of organic filters 34. After passing through filters 34 coloration and inorganic impurities have been removed. Filters 34 would be in series and would vary in composition. Some of filters 34 would be micro strainers and others filters of activated charcoal.

The fifth and final step relates to the dehydrating and removing of the residue of sewage sediment. The sediment which remains in second tank 24 is in the form of a sludge. It is difficult to handle the sludge and it is therefore preferable that the sludge be dehydrated. In order to speed dehydration through evaporation heaters and fans may be used. There are also a number of chemicals which can be added to further reduce moisture content. After treatment the sediment is in a form that can be placed in a land fill site without presenting a hazard to the environment. However, the level of microorganisms in the sediment after the ultrasonic treatment is such that the applicant recommends that the sediment be mixed with animal manure or another suitable plant growth adjuvant which will supplement its nitrogen content and used as fertilizer.

It will be apparent to one skilled in the art of sewage treatment that the length of the treatment process is considerably reduced as compared to other methods presently employed. Using previous methods (even omitting the filtration step) the treatment of the sewage takes approximately 14 days. Using the applicant's described method (including the filtration step) the treatment of the sewage takes approximately 3 days; 1 day for screening of solids, 1 day for ultrasonic treatment and sedimentation, and 1 day for filtration of liquids and dehydration of solids. It will also be apparent to one skilled in the art that the present method is also more effective in killing microorganisms. Using previous methods some animal diseases and most plant diseases survived the treatment process. Using the applicant's described method the sewage can be virtually sterilized while still permitting a considerable saving in the time required for sewage treatment. It will finally be apparent to one skilled in the art that once the teachings of the present method are known and understood various modifications may be made to the sewage treatment system illustrated without departing from the spirit and scope of the invention.

The embodiments of the invention in which an exclusive property or privilege is claimed are defined as follows:

1. A method of sewage treatment, comprising the steps of:
   a. firstly, directing the sewage to be treated into a first tank in which a mechanical rake is rotatably mounted to screen out coarse solids;
   b. secondly, passing the sewage into a second tank and subjecting the sewage in said second tank to ultrasonic vibrations in a range between 15 and 150 kilohertz for a period in excess of 12 seconds through use of a plurality of ultrasonic probes mounted on one or more arms which rotate in the second tank thereby achieving cavitation of the sewage;
   c. thirdly, draining liquids from the sewage;
   d. fourthly, removing sewage residue remaining after drainage of liquids.

2. A method as defined in claim 1, wherein the sewage is subjected to ultrasonic vibrations for a further period of approximately 3 hours such that a degassing of the sewage occurs.

3. A method as defined in claim 1, including a further step of letting the sewage stand to permit sedimentation and the formation of the sewage residue prior to drainage of liquids.

4. A method as defined in claim 1, including a further step of passing the liquids through a series of filters after drainage.

5. A method as defined in claim 1, including a further step of dehydrating the sewage residue remaining after drainage of liquids.

6. A method as claimed in claim 1, the second tank being generally oval in shape thereby enhancing the reflection of ultrasonic vibrating.

7. A method of sewage treatment, comprising the steps of:
   a. firstly, passing the sewage into a first tank having a rotatably mounted mechanical rake to screen out coarse solids;
   b. secondly, passing the sewage into a second tank having a plurality of ultrasonic probes mounted on rotating arms such that each of the probes extends into and subjects the sewage to ultrasonic vibrations in a range of between 15 kilohertz and 150 kilohertz for a period of approximately 3 hours such that cavitation and degassing of the sewage occurs;
   c. thirdly, letting the sewage stand in the second tank for a period of between 6 and 24 hours to permit sedimentation and the forming of sewage sediment residue;
   d. fourthly, draining liquids from the sewage in the second tank and passing the liquids through a series of filters formed of an organic material; and
   e. fifthly, dehydrating and removing the sewage sediment residue remaining in the second tank after drainage of liquids.

* * * * *